Figure 1:
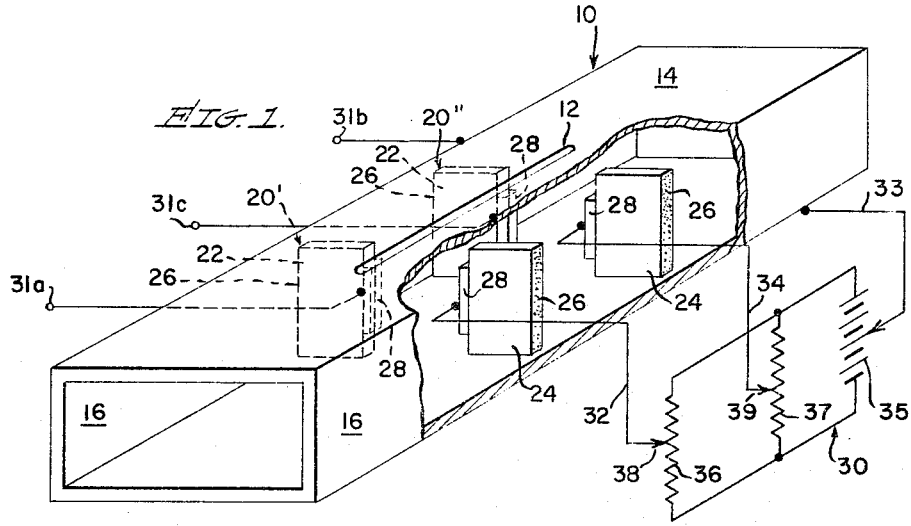

Aug. 9, 1966   F. J. GOEBELS, JR   3,266,043
IRIS CONTROLLED SLOT COUPLER
Filed March 14, 1963

INVENTOR.
FRANK J. GOEBELS JR.,
By James K. Haskell
ATTORNEY.

by Howard E. Shanks on July 19, 1960. However, with this device, mechanical adjustments are necessary to control the radiation characteristics of the slot.

In another known device, the two plates of a resonant iris are formed from ferrite material and subjected to a static magnetic field provided by externally mounted electromagnets. In this device, the iris is permanently positioned and the slot radiation controlled by an appropriate adjustment of the magnetic field intensity in one plate relative to the other. Here, the plates act as inductive elements which distort the otherwise symmetrical current distribution in the vicinity of the centered slot causing it to radiate. A complete description is contained in U.S. Letters Patent No. 2,946,056 to Howard E. Shanks, dated July 19, 1960. However, in this device, electromagnets are required.

In brief, the slot coupler of the present invention comprises a centered slot cut in the broad wall of a rectangular waveguide and a semiconductor iris, or irises, mounted transversely in the waveguide near the slot. Non-linear semiconductor devices are used to form the iris and may be either variable capacitance diodes known as varactor diodes or plate-like partitions of semiconductor material. By differentially biasing the semiconductor devices accordingly, a modal asymmetry is created distorting the current flow in the vicinity of the slot and causing it to radiate in a predictable fashion.

Accordingly, it is an object of the present invention to provide an iris controlled slot coupler with which the radiation characteristics of a slot or slot array so equipped may be controlled electronically.

It is another object of the invention to provide an iris controlled slot coupler possessing a faster response time than prior iris controlled slots.

It is still another object of the invention to provide an iris controlled slot coupler wherein lower driving power is required than that normally needed for ferrite irises.

It is a further object to provide an iris controlled slot coupler that is particularly applicable in slot arrays and still allows suitable isolation between the control circuitry of consecutive irises.

Another object is to provide a simple, compact iris controlled slot coupler in which a dry cell battery may be used as a source of driving power.

In accordance with these and other features and objects of the invention, there is provided an electronically variable waveguide slot coupler comprising a rectangular waveguide having a slot in a broadwall thereof, iris means including semiconductor elements disposed in the waveguide transversely from both sides of the slot, and control means external to the waveguide and including a voltage source coupled to the elements for biasing the same to alter the current distribution of energy propagated through the waveguide and control the ratiation from the slot.

Figure 2:
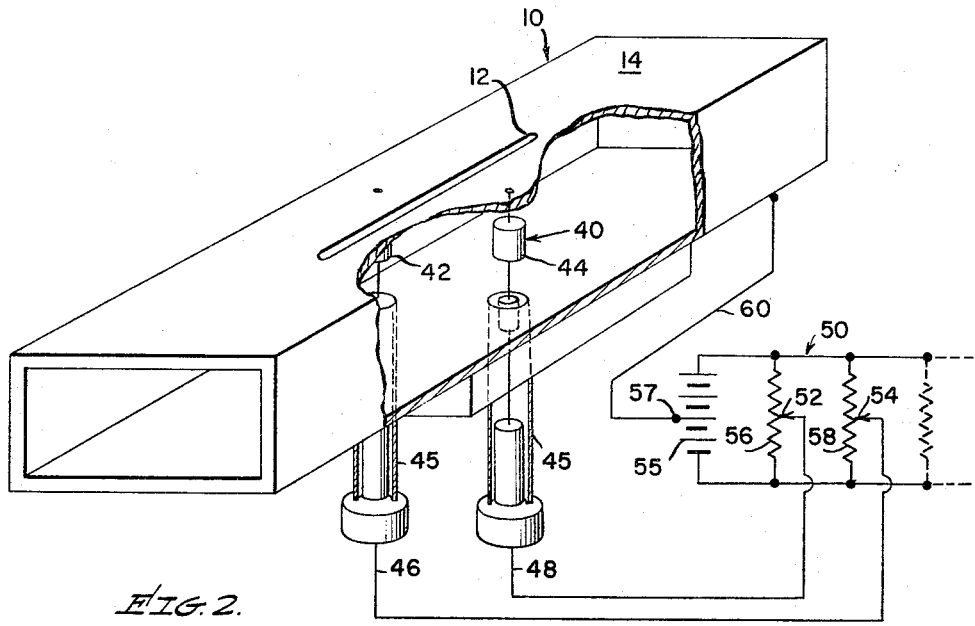

The following specifications and the accompanying drawings described and illustrate preferred embodiments of the present invention, like reference characters being used to designate like parts throughout the drawings, wherein:

FIG. 1 is a perspective view, partially in section, showing one embodiment of the iris controlled slot coupler according to the present invention utilizing two irises formed from plate-like blocks of semiconductor material; and FIG. 2 is a perspective view, partially in section, of another embodiment of the iris controlled slot coupler of the invention wherein variable capacitance diodes are used to form the iris.

Referring now to the drawings, a portion of a standard rectangular waveguide 10 is provided with a radiating centered slot 12 cut in a broadwell such as the upper broadwall 14. In a first embodiment shown in FIG. 1, two fixed irises 20' and 20'' of a first type are symmetrically disposed in the waveguide 10 about the center of the slot 12. In FIG. 2, another embodiment utilizing a single iris 40 of a second type is shown.

In FIG. 1, the irises 20' and 20'' each include two spaced apart semiconductor posts 22 and 24 and, when connected as described herein, each post behaves as a semiconductor diode. Each of the diode posts 22 and 24 extend inwardly towards each other from the narrow walls 16 and are electrically grounded thereat to the waveguide 10. A metallized layer deposited on the adjoining edge surface of each diode post forms a junction 26 and facilitates such an electrical connection.

A similar metallized layer forms a second junction 28 parallelling the junction 26. The conductors 32 and 34, connected to and extending from the junctions 28, provide an electrical path for bias current to flow from a voltage source as for example, the voltage biasing network 30. The network 30 may include a battery 35 connected across the potentiometers 36 and 37 each having movable taps 38 and 39 respectively connected to the diode posts 24 at the junctions 28 thereof. An intermediate terminal of the battery 35 may be grounded to the waveguide 10 by a conductor 33.

A similar bias network, not shown, is also provided to bias the diode posts 22 and is connected at the terminals 31a, 31b and 31c which, in all other respects, are analogous to the conductors 32, 33, and 34 respectively.

With this bias arrangement, a variable electric field can be independently established between the junctions 26 and 28 of each of the diode posts 22 and 24, by proper adjustment of the appropriate potentiometers. However, it is necessary that the junctions 28 be electrically insulated from the broadwalls 14 to prevent a short circuit of the bias voltage. This, for example, may be accomplished by the removal of small outer end portions of the metallized layers forming the junctions 28.

Thus, by controlling the bias voltage applied across each of the diode posts 22 and 24, their microwave properties can be changed and in so doing, the current distribution existing at the slot 12 is varied to effect electronic control, in amplitude and phase, of the microwave radiation emanating from the slot 12.

It should be pointed out that, where appropriate, a low frequency alternating current generator, not shown, may be used in place of the battery 35.

In FIG. 2, the iris 40 consists of two symmetrically disposed varactor diodes 42 and 44 lying in a transverse plane passing through the center of the slot 12. One terminal of the diodes 42 and 44 is grounded to the waveguide 10 at the broadwall 14. The other terminal is connected to a voltage biasing network 50 by conductors 46 and 48 which terminate at the movable taps 52 and 54 respectively of the potentiometers 56 and 58. A source of voltage, as for example, a battery 55 is connected across the potentiometers 56 and 58 and, at an intermediate terminal 57, is also grounded to the waveguide 10 by a conductor 60.

By biasing the varactor diodes 42 and 44 differentially, the electrical characteristics of one diode with respect to the other is varied and distorts the current density in the vicinity of the slot 12 causing the slot coupling to change in a continuous fashion.

A conventional RF choke, as for example the commercially available coaxial choke 45, is provided in the biasing circuits for the varactor diodes 42 and 44 between each diode and its corresponding potentiometers 52 and 54. With this arrangement, the diodes 42 and 44 may be biased externally to present a desired RF impedance to the RF energy propagating through the waveguide 10. At the same time, the RF chokes permit passage of a direct current, or a low frequency alternating current, for biasing the varactor diodes 42 and 44.

It should be pointed out that either one of the irises 20' and 20" may be disposed in the waveguide 10 in a plane similar to the iris 40 of FIG. 2; similarly, two irises of the type shown in FIG. 2 may be disposed relative to the slot 12 as shown in FIG. 1. Moreover, the symmetrically disposed iris 40 of FIG. 2 may be asymmetrically disposed either in the transverse plane or in a plane passing transversely through the slot 12 at other than its center.

By incorporating a single semiconductor iris, such as the iris 20' or the iris 40, transversely in a waveguide through the center of the radiating slot, the amplitude of the slot radiation is variable as a function of the applied bias voltage. Adding another such iris and longitudinally displacing each from the slot center, the phase as well as the amplitude is variable as a function of the bias voltage. With either one of the irises, 20' or 40, asymmetrically displaced relative to the slot center, the phase predominantly is variable as a function of the bias voltage.

For instance, in an iris controlled slot coupler of the type shown in FIG. 2, a 28 decibel range in amplitude control of slot radiation was measured using the type 1N896 varactor diodes as manufactured by Hughes Aircraft Company. Each diode was spaced 0.176 inch from the narrow walls of a standard X-band rectangular waveguide (i.e., diode separation of 0.548"). To achieve this coupling range, the diodes were biased forwardly 0.31 volt for minimum slot coupling and, for maximum slot coupling, one of the diodes is biased —5.0 volts while the other is held constant. Since the capacitance varies non-linearly as a function of the bias voltage applied across the varactor diode, a non-linear relationship exists between the slot coupling and the differential bias voltage applied to the diodes forming the iris.

It should be noted that although preferred, it is not essential that the iris or irises be symmetrically disposed in the waveguide about its longitudinal centerline or that the radiating slot be the shunt slot 12 centrally positioned in the waveguide broadwall since, by proper biasing of the semiconductor irises, an asymmetrical iris or slot configuration may in effect be made to appear symmetrical and vice versa to the RF energy propagating through the waveguide and eventually coupled to the slot.

Thus, there has been shown and described an iris controlled slot coupler for controlling the phase amplitude characteristics of the energy radiated from a slot. The resultant slot coupler is simple and compact in structure, light in weight and readily adaptable in new or existing slot and slot arrays regardless of the type or the slot group configuration.

While only preferred embodiments of the invention have been set forth, others may be made without departing from the intended scope of the invention, the purpose here being primarily descriptive and not limiting in any sense.

What is claimed is:

1. An electronically variable waveguide slot coupler comprising, a rectangular waveguide having a slot in a broad wall thereof; iris means including semiconductor elements disposed in said waveguide transversely from both sides of said slot; and electrical control means external to said waveguide and including a voltage source electrically coupled to said elements for electrically biasing the same to alter the current distribution of energy propagated through said waveguide and control radiation from said slot.

2. An electronically variable waveguide slot coupler comprising, a rectangular waveguide having a slot in a broad wall thereof; iris means symmetrically mounted within said waveguide in a plane extending transversely from said slot, said iris means including semiconductor elements; and electrical control means external to said waveguide and including a voltage source electrically coupled to said elements for electrically biasing the same to alter the current distribution of energy propagated through said waveguide and control radiation from said slot.

3. An electronically variable waveguide slot coupler comprising, a rectangular waveguide having a slot in a broad wall thereof; iris means symmetrically mounted within said waveguide in a transverse plane to said slot, said iris means including inductive elements of semiconductive material extending from the walls of said waveguide; and electrical control means external to said waveguide and including a voltage source electrically coupled to said elements for electrically biasing the same to alter the current distribution of energy propagated through said waveguide and control radiation from said slot.

4. An electronically variable waveguide slot coupler comprising, a rectangular waveguide having a slot in a broad wall along the longitudinal centerline thereof; iris means symmetrically mounted within said waveguide in a transverse plane to said slot, said iris means including inductive elements of semiconductive material extending inwardly from the narrow walls of said waveguide; and control means external to said waveguide and including a voltage source coupled to said elements for biasing the same differentially to alter the current distribution of energy propagated through said waveguide and control radiation from said slot.

5. An electronically variable waveguide slot coupler comprising, a rectangular waveguide having a slot in a broad wall thereof; iris means symmetrically mounted within said waveguide in a plane extending transversely through said slot, said iris means including a pair of plate-like inductive elements of semiconductive material extending in electrical connecting relationship to and inwardly from the narrow walls of said waveguide, each of said plate-like inductive elements having an inner edge surface disposed in a plane orthogonal to the broad wall and a conductive layer for forming a junction along said inner surface, said layer being electrically isolated from the broad walls of said waveguide; and electrical control means external to said waveguide and including a voltage source electrically coupled to each of said elements for biasing said plate-like inductive elements differentially to alter the current distribution of energy propagated through said waveguide and control radiation from said slot.

6. The slot coupler in accordance with claim 5 wherein said iris means includes a first pair and a second pair of elements of semiconductive material each symmetrically disposed in spaced apart relationship from the longitudinal center of said slot.

7. An electronically variable waveguide slot coupler comprising, a rectangular waveguide having a slot in a broad wall along the longitudinal centerline thereof; iris means symmetrically mounted within said waveguide in a plane extending transversely through said slot, said iris means including a pair of inductive elements of semiconductive material extending between the broad walls of said waveguide, each of said inductive elements being disposed in a plane orthogonal to the broad walls and to the narrow walls of said waveguide; and electrical control means external to said waveguide and including a voltage source electrically coupled to each of said inductive elements for electrically biasing said inductive elements differentially to alter the current distribution of energy propagated through said waveguide and control radiation from said slot.

8. The slot coupler in accordance with claim 7 wherein said iris means includes a first pair and a second pair of elements of semiconductive material each symmetrically disposed in spaced apart relationship from the longitudinal center of said slot.

9. An electronically variable waveguide slot coupler comprising a rectangular waveguide having a slot in a broad wall thereof; iris means including semiconductor diode elements mounted within said waveguide in a plane extending transversely to said slot; and electrical control means external to said waveguide and including a voltage source electrically coupled to said iris means for electrically biasing said elements to alter the current distribution of energy propagated through said waveguide and control radiation from said slot.

10. An electronically variable waveguide slot coupler comprising a rectangular waveguide having a slot in a broad wall thereof; iris means including semiconductor diodes having variable capacitance characteristics being transversely disposed within said waveguide and adjacent either side of said slot; and electrical control means external to said waveguide and including a voltage source electrically coupled to said iris means for electrically biasing said diode to alter the current distribution of energy propagated through said waveguide and control radiation from said slot.

11. An electronically variable waveguide slot coupler comprising a rectangular waveguide having a slot in a broad wall along the longitudinal centerline thereof; iris means formed of capacitive elements and including varactor diodes transversely mounted within said waveguide on both sides of said slot; and control means external to said waveguide and including a voltage source coupled to said iris means for biasing said diodes to alter the current distribution of energy propagated through said waveguide and control radiation from said slot.

12. An electronically variable waveguide slot coupler comprising a rectangular waveguide having a slot in a broad wall thereof; iris means and including semiconductor diodes mounted in pairs within said waveguide along both sides of said slot each said pair being mounted in a transverse plane that intersects the slot; and adjustable electrical control means external to said waveguide and including a voltage source of low frequencies down to and including zero cycles per second for electrically biasing said diodes and circuit means to form a low impedance path to the flow of current between said source and said diodes at the low frequencies, said circuit means concomittantly forming a high impedance path to substantially inhibit the flow of current therein at microwave frequencies so that the microwave current distribution of energy propagated through said waveguide is altered and the slot radiation in amplitude and phase is a function of the bias selectively impressed across said diodes.

13. An electronically variable waveguide slot coupler comprising a rectangular waveguide having a slot in a broad wall along the centerline thereof; iris means formed of capacitive elements and including varactor diodes transversely mounted in pairs within said waveguide along both sides of said slot; and adjustable control means external to said waveguide and including a voltage source of a low frequency including zero for biasing said diodes and circuit means forming a low impedance path to the flow of current at said low frequencies between said source and said diodes, said circuit means concomittantly forming a high impedance path to substantially inhibit the flow of current therein at microwave frequencies so that the current distribution of energy propagated through said waveguide is altered and the slot radiation in amplitude and phase is a function of the bias selectively impressed across said diodes.

14. An electronically variable waveguide slot coupler comprising a rectangular waveguide having a slot in a broad wall along the centerline thereof; iris means formed of capacitive elements and including varactor diodes symmetrically mounted in pairs within said waveguide in a plane transverse to said slot and passing through the center thereof; and adjustable control means external to said waveguide and including a voltage source of a low frequency including zero for biasing said diodes and circuit means forming a low impedance path to the flow of current at said low frequencies between said source and said diodes, said circuit means concomittantly forming a high impedance path to substantially inhibit the flow of current therein at microwave frequencies so that the current distribution of energy propagated through said waveguide is altered and the slot radiation in amplitude and phase is a function of the bias selectively impressed across said diodes.

15. An electronically variable waveguide slot coupler comprising a rectangular waveguide having a slot in a broad wall along the centerline thereof; iris means formed of capacitive elements and including varactor diodes symmetrically mounted in pairs within said waveguide in at least two transverse planes each disposed longitudinally a predetermined distance from the center of said slot; and adjustable control means external to said waveguide and including a voltage source of a low frequency including zero for biasing said diodes and circuit means forming a low impedance path to the flow of current at said low frequencies between said source and said diodes, said circuit means concomittantly forming a high impedance path to substantially inhibit the flow of current therein at microwave frequencies so that the current distribution of energy propagated through said waveguide is altered and the slot radiation in amplitude and phase is a function of the bias selectively impressed across said diodes.

16. An electronically variable waveguide slot coupler comprising a rectangular waveguide having a slot in a broad wall along the centerline thereof; iris means formed of capacitive elements and including varactor diodes asymmetrically mounted in pairs within said waveguide in a plane transverse to said slot and passing through the center thereof; and adjustable control means external to said waveguide and including a voltage source of a low frequency including zero for biasing said diodes and circuit means forming a low impedance path to the flow of current at said low frequencies between said source and said diodes, said circuit means concomittantly forming a high impedance path to substantially inhibit the flow of current therein at microwave frequencies so that the current distribution of energy propagated through said waveguide is altered and the slot radiation in amplitude and phase is a function of the bias selectively impressed across said diodes.

17. An electronically variable waveguide slot coupler comprising a rectangular waveguide having a slot in a broad wall along the centerline thereof; iris means formed of capacitive elements and including varactor diodes asymmetrically mounted in pairs within said waveguide in at least two transverse planes each disposed longitudinally a predetermined distance from the center of said slot; and adjustable control means external to said waveguide and including a voltage source of a low frequency including zero for biasing said diodes and circuit means forming a low impedance path to the flow of current at said low frequencies between said source and said diodes, said circuit means concomittantly forming a high impedance path to substantially inhibit the flow of current therein at microwave frequencies so that the current distribution of energy propagated through said waveguide is altered and the slot radiation in amplitude and phase is a function of the bias selectively impressed across said diodes.

18. An electronically variable waveguide slot coupler comprising a rectangular waveguide having a slot in a broad wall along a line parallel to and spaced from the centerline thereof; iris means including semiconductor diodes transversely mounted in pairs within said waveguide along both sides of said slot and symmetrically therewith; and adjustable electrical control means external to said waveguide and including a voltage source of low frequencies down to and including zero frequency for biasing said diodes, and circuit means forming a low impedance path to the flow of current at said low frequencies between said source and said diodes, said circuit means concomittantly forming a high impedance path to substantially inhibit the flow of current therein at microwave frequencies so that the current distribution of microwave energy propagated through said waveguide is altered and the slot radiation in amplitude and phase is a function of the electrical bias selectively impressed across said diodes.

19. The slot coupler in accordance with claim 18 wherein each said iris means comprises two semiconductor diodes disposed in a transverse plane symmetrically about the off-centered slot, said plane being longitudinally disposed along said slot a predetermined distance from the center thereof.

References Cited by the Examiner

UNITED STATES PATENTS 2,946,056   7/1960   Shanks _____ 343—768

OTHER REFERENCES

Schuller et al.: Inductive Elements-Electronics, vol. 33, No. 17, April 22, 1960, pages 60 and 61 relied on.

Watson-Resonant Slot Rectifier Guide-Physical Principles of Waveguide Transmission-Clarenden Press 1947, pages 100–103.

HERMAN KARL SAALBACH, *Primary Examiner.*

E. LIEBERMAN, W. K. TAYLOR,
*Assistant Examiners.*